United States Patent [19]

Patel

[11] Patent Number: 5,591,798
[45] Date of Patent: Jan. 7, 1997

[54] HIGH TEMPERATURE STABLE, LOW SOLVENT SWELLING THERMOPLASTIC ELASTOMER COMPOSITIONS

[75] Inventor: Raman Patel, Akron, Ohio

[73] Assignee: Advanced Elastomer Systems, L.P., Akron, Ohio

[21] Appl. No.: 645,940

[22] Filed: May 14, 1996

Related U.S. Application Data

[63] Continuation of Ser. No. 390,900, Feb. 16, 1995, abandoned, which is a continuation-in-part of Ser. No. 90,367, Jul. 12, 1993, abandoned, which is a continuation of Ser. No. 179,816, Apr. 11, 1988, abandoned.

[51] Int. Cl.$^6$ ............................................. C08L 77/00
[52] U.S. Cl. ................................ 524/514; 525/183
[58] Field of Search ............................... 525/183; 524/514

[56] References Cited

U.S. PATENT DOCUMENTS

| | | | |
|---|---|---|---|
| 4,104,210 | 8/1978 | Coran et al. | 260/4 R |
| 4,130,535 | 12/1978 | Coran et al. | 260/33.6 AQ |
| 4,141,863 | 2/1979 | Coran et al. | 260/3 |
| 4,310,638 | 1/1982 | Coran et al. | 525/183 |
| 4,311,628 | 1/1982 | Abdou-Sabet et al. | 260/33.6 AQ |
| 4,327,199 | 4/1982 | Coran et al. | 525/176 |
| 4,430,479 | 2/1984 | Merton et al. | 525/183 |
| 4,473,683 | 9/1984 | Coran et al. | 525/78 |
| 4,474,927 | 10/1984 | Novak | 525/183 |
| 4,555,546 | 11/1985 | Patel | 525/194 |
| 4,694,042 | 9/1987 | McKee et al. | 525/66 |
| 5,075,380 | 12/1991 | Lindner et al. | 525/183 |
| 5,091,478 | 2/1992 | Saltman et al. | 525/179 |
| 5,177,147 | 1/1993 | Spenadel et al. | 525/88 |

FOREIGN PATENT DOCUMENTS

| | | |
|---|---|---|
| 0234819 | 9/1987 | European Pat. Off. . |
| 0258040 | 3/1988 | European Pat. Off. . |

OTHER PUBLICATIONS

Hawley's Condensed Chemical Dictionary, Eleventh Edition p. 645.

*Primary Examiner*—Ana Woodward
*Attorney, Agent, or Firm*—William A. Skinner

[57] ABSTRACT

Thermoplastic elastomer compositions comprise a blend of polyamide resin and a covalently-crosslinked acrylate rubber. Such compositions can be prepared by dynamic vulcanization of the rubber in admixture with the polyamide and can exhibit high temperature dimensional stability and low oil swell. The compositions can be used to form a variety of molded, extruded, or calendered articles.

19 Claims, No Drawings

HIGH TEMPERATURE STABLE, LOW SOLVENT SWELLING THERMOPLASTIC ELASTOMER COMPOSITIONS

This is a continuation of application Ser. No. 08/390,900, filed Feb. 16, 1995, now abandoned, which is a continuation-in-part of application Ser. No. 08/090,367, filed Jul. 12, 1993, now abandoned, which is a continuation of application Ser. No. 07/179,816, filed Apr. 11, 1988, now abandoned.

Disclosed herein are inventions of thermoplastic elastomer compositions which exhibit low solvent swelling at high temperatures. Particularly disclosed are inventions of thermoplastic elastomer compositions comprising polyamide and crosslinked acrylic ester copolymer rubber.

BACKGROUND

Unless indicated otherwise all temperatures herein are in degrees Celsius.

Thermoplastics are compositions which can be molded or otherwise shaped and reprocessed at temperatures above their melting or softening point. Thermoplastic elastomers are materials which exhibit both thermoplastic and elastomeric properties, i.e. the materials can be processed as thermoplastics but have physical properties common to elastomers. Shaped articles may be formed from thermoplastic elastomers by extrusion, injection molding or compression molding without the time-consuming cure step required with conventional vulcanizates. Elimination of the time required to effect vulcanization provides significant manufacturing advantages. Further, thermoplastic elastomers can be reprocessed without the need for reclaiming and, in addition, many thermoplastic elastomers can be thermally welded.

Non-polar rubbers, e.g. polybutadiene, random, graft and block copolymers of styrene and butadiene, EPDM rubber, natural rubber, polyisoprene and the like, are readily mixable with non-polar thermoplastics such as polypropylene, polyethylene and polystyrene. Non-polar, highly unsaturated rubbers are generally not used at temperatures above about 125°; and non-polar thermoplastics have low melting points, e.g. about 120° for crystalline polyethylene, about 170° for crystalline polypropylene and about 105° for polystyrene. Thermoplastic elastomers based on non-polar, unsaturated rubbers and thermoplastics generally comprise stabilizers to achieve desired properties in high temperature applications. For instance, known thermoplastic elastomers, e.g. as disclosed in U.S. Pat. Nos. 4,104,210; 4,130,535 and 4,311,628, based on blends of diene or EPDM rubber and polyolefins are generally used at temperatures below about 120°.

Non-polar rubbers are generally used in applications free from extended exposure to solvent-like fluids such as automotive transmission fluid, motor oil, antifreeze, etc. to avoid swelling and the possible resulting reduction in performance properties. Resistance to such swelling, especially for application temperatures below about 125°, can be achieved by use of polar rubbers, e.g. nitrile rubber, chlorinated polyethylene rubber, neoprene, and the like. Because polar rubbers are not generally miscible with non-polar thermoplastic polymers such as polypropylene, it is commonly necessary to provide compatibilization. See, for instance, U.S. Pat. No. 4,555,546 which discloses blends of polyolefins, cured acrylic ester copolymer rubber and graft copolymer having polyolefin compatibilizing segments and rubber compatibilizing segments.

Alternatively, as disclosed in U.S. Pat. No. 4,141,863 polar rubbers can be blended with polar thermoplastics, e.g. polyamides, polyesters, polyacrylates, polycarbonates, etc. Many of the more desired polar thermoplastic polymers melt at high temperature, for instance nylon 6 melts at about 225°. Since many preferred polar rubbers may tend to degrade when melt blended for extended periods with high melt temperature polar thermoplastic, resulting thermoplastic elastomer compositions may not have optimal properties.

Fortunately, certain polar acrylate rubbers are exceptionally heat stable and can be useful in blends with thermoplastics. Such rubbers include acrylic ester copolymer rubbers, including ethylene/alkyl acrylate ester copolymer rubbers and functionalized, e.g. acid-modified, derivatives thereof. See, for instance, U.S. Pat. Nos. 4,310,638; 4,327,199; and 4,473,683 which disclose blends of polar thermoplastic polymers, i.e. polyamides, polyesters and styrenic polymers, respectively, with acid-containing acrylic ester copolymer rubber that is neutralized, i.e. ionically crosslinked with magnesium or zinc oxide. While such blends exhibit enhanced thermal stability, they are susceptible to solvent swelling, especially at higher temperatures where the ionic crosslink bonding becomes labile.

SUMMARY OF THE INVENTION

This invention provides thermoplastic elastomer compositions comprising blends of polyamide resin and covalently-crosslinked acrylate rubber. Such blends are preferably in a weight ratio of rubber to polyamide of about 9:1 to about 4:6. Such thermoplastic elastomer compositions exhibit excellent high temperature dimensional stability and exceptional resistance to solvent swelling. In preferred embodiments such rubber is advantageously a functionalized olefin/acrylic ester copolymer rubber that is dynamically vulcanized, e.g. by a polyfunctional, covalently crosslinking agent. In preferred embodiments the polyamide is advantageously a polycaprolactam (NYLON 6), polyhexamethyleneadipamide (NYLON 66), or mixtures or copolymers thereof. As used herein the term "elastomeric" refers to thermoplastic compositions which exhibit rubber-like elasticity, i.e. have a tension set of less than about 60 percent, preferably less than about 50 percent.

DESCRIPTION OF PREFERRED EMBODIMENTS

POLYAMIDE RESIN:

Suitable thermoplastic polyamide resin comprises thermoplastic crystalline or amorphous high molecular weight solid polymers including homopolymers, copolymers and terpolymers having recurring amide units within the polymer chain. Both fiber forming and molding grade nylons are suitable polyamide resins. Commercially available nylons having a softening point or melting point above 100° may be advantageously used in the practice of this invention; such nylons having a softening or melting point between 160° and 280° are preferred. Examples of suitable polyamides are polylactams such as NYLON 6, polypropiolactam (NYLON 3), polyenantholactam (NYLON 7), polycapryllactam (NYLON 8), polylauryllactam (NYLON 12), and the like; homopolymers of aminoacids such as polyaminoundecanoic acid (NYLON 11); polypyrrolidinone (NYLON 4); copolyamides of dicarboxylic acid and diamine such as NYLON 6,6, polytetramethyleneadipamide (NYLON 4,6), polytetramethyleneoxalamide (NYLON 4,2), polyhexamethyleneazelamide (NYLON 6,9), polyhexamethylene-sebacamide (NYLON 6,10), polyhexamethyleneisophthalamide (NYLON 6,I), polyhexamethylenedodecanoic acid (NYLON 6,12) and the like; aromatic and partially aromatic polyamides; copolyamides such as of caprolactam and hexamethyleneadipamide (NYLON 6/6,6), or a terpolyamide, e.g. NYLON 6/6,6/6,10; block copolymers such as polyether polyamides; or mixtures thereof. Additional examples of suitable polyamides are described in the Encyclopedia of Polymer Science and Technology, Second Edition, Vol. 11, pages 315–476, incorporated herein by reference. Preferred polyamides employed in this invention are NYLON 6, NYLON 11, NYLON 12, NYLON 6,6, NYLON 6,9, NYLON 6,10, and NYLON 6/6,6.

ACRYLATE RUBBER:

Acrylate rubbers advantageously useful in the thermoplastic elastomer compositions of this invention comprise vulcanizable, i.e. crosslinkable, acrylate rubbers such as polyacrylate rubbers, acrylic ester copolymer rubbers and the like. Suitable polyacrylate rubbers are described in Rubber World Blue Book, 1987 Edition, at pages 393–394, and can have functional groups, e.g. acid, hydroxy, epoxy or other functional groups, as crosslinking sites; alternatively, acid group crosslinking sites can be generated in the rubber, e.g. by partial hydrolysis of ester groups. In many embodiments olefin/acrylic ester copolymer rubbers are preferred. Such rubbers can be copolymers produced by polymerizing at least one alpha olefin with at least one $C_1$–$C_{18}$ alkyl (meth)acrylate and, optionally, a minor amount of an unsaturated functionalized monomer which can provide crosslinking sites. Such functionalized monomer can comprise acid, hydroxy, epoxy, isocyanate, amine, oxazoline, diene or other reactive groups. In the absence of such functionalized monomer, crosslinking sites can be generated, e.g. by partial hydrolysis of ester groups of the rubber. Suitable alpha olefins for polymerization of such copolymer rubbers include ethylene, propylene, butene-1, isobutylene, pentenes, heptenes, octenes, and the like or mixtures thereof; $C_1$–$C_4$ alpha olefins are preferred and ethylene is often most preferred. Suitable alkyl (meth)acrylates for copolymerizing with the alkene include methyl acrylate, ethyl acrylate, t-butyl acrylate, n-butyl acrylate, 2-ethylhexyl acrylate, methyl methacrylate, ethyl methacrylate, n-butyl methacrylate, and the like or a mixture thereof; $C_1$–$C_{12}$ alkyl (meth)acrylates are often preferred, and $C_1$–$C_4$ alkyly (meth)acrylates-are most often preferred. In many cases a preferred olefin/acrylic ester copolymer rubber comprises unsaturated carboxylic acid monomer units, e.g. derived from (meth)acrylic acid or maleic acid, anhydride units, e.g. derived from maleic anhydride or partial ester units, e.g. derived from mono ethyl maleate. In many cases a preferred olefin/acrylic ester copolymer rubber is a terpolymer of ethylene, $C_1$–$C_4$ alkyl acrylate and an acidic monomer unit; more preferably such terpolymer comprises at least about 30 mole percent of ethylene, about 10 to 69.5 mole percent of methyl acrylate and about 0.5 to 10 mole percent mono ethyl maleate. In all cases it is preferred that the acrylate rubber be essentially non-crystalline and have a glass transition temperature ($T_g$) below room temperature, i.e. below about 23°.

CROSSLINKING AGENTS:

Crosslinking agents employed in the thermoplastic elastomer compositions of this invention are polyfunctional, i.e. at least difunctional, compounds selected to cure the acrylate rubber, i.e. crosslink the rubber, by covalently bonding with the reactive functional groups of the rubber. When the rubber has carboxy functional groups, e.g. derived from acrylic or maleic acid units, the covalent crosslinking agent is advantageously a compound with an hydroxy, amine, isocyanate, epoxy or other acid reactive functional group. Effective crosslinking agents include diols such as bisphenol-A, polyols such as pentaerythritol, amines such as methylene dianiline, diphenyl guanidine and the like, isocyanates such as toluene di-isocyanate and isocyanate-terminated polyester prepolymer, epoxides such diglycidyl ether of bisphenol-A and compounds comprising more than one type of acid reactive functional group such as tris hydroxymethyl amino methane. Other covalent crosslinking agents include organic ligand complexed metals such as neoalkoxy tri[N-ethylaminoethylamino] titanite. Preferred crosslinking agents, e.g. amines, do not strongly interact with the polyamide resin. Generally, the amount of crosslinking agent does not exceed about 15 percent by weight of the acrylate rubber, depending on the molecular weight of the rubber and crosslinking agent. Preferred amounts of crosslinking agent are readily determined by routine experimentation to optimize desired properties of the thermoplastic elastomer compositions of this invention. In the case of crosslinking agents, such as isocyanates and epoxies, which can interact with the polyamide resin, it is generally desirable to use low amounts of crosslinking agent to avoid excessive crosslinking of the polyamide resin. The amount of crosslinking agent and the degree of crosslinking can be characterized in terms of the amount of rubber that is extractable from a thermoplastic elastomer composition. As used herein the term "extractable" refers to rubber that is extractable from a thermoplastic elastomer composition comprising a blend of a thermoplastic polyamide resin and a covalently-crosslinked acrylate rubber. Rubber can be extractable, e.g. because of a low level of crosslinking agent and/or because it comprises a non-crosslinkable fraction. Extractable rubber is conveniently determined by the weight loss from thin (about 0.2 mm) pressed films of thermoplastic elastomer compositions after immersion for 48 hours in a solvent (at 23°). Such solvent is selected as one in which the rubber is substantially soluble and in which the polyamide is substantially insoluble. Such solvents can include dichloromethane, toluene, tetrahydrofuran and the like. Some preferred thermoplastic elastomer compositions will comprise sufficient crosslinking agent so that, after crosslinking, e.g. by dynamic vulcanization, no more than about 50 percent of the rubber is extractable. In other compositions, more desirable properties are achieved when not more than about 30 percent of the rubber is extractable. In still other compositions desirable properties are achieved when not more than about 20 percent of the rubber is extractable.

PLASTICIZER:

In certain aspects of this invention thermoplastic elastomer compositions also comprise plasticizer which extends the range of proportions of polyamide to rubber in the composition while still retaining elastomeric properties. For example, without plasticizer the weight ratio of rubber to polyamide generally cannot be less than about 4:6 without losing rubber-like elasticity; whereas, with plasticizer the weight of polyamide can be increased. Moreover, in certain preferred aspects of this invention the incorporation of plasticizers can improve the composition's resistance to oil swelling, its heat stability, and reduce hysteresis, cost and permanent set. Generally, the quantity of plasticizer, when present, is between about 10 and 50 parts by weight of the composition. Suitable plasticizers are non-reactive with the polyamide resin and include phthalate esters such as dicyclohexyl phthalate, dimethyl phthalate, dioctyl phthalate, butyl benzyl phthalate and benzyl phthalate; phosphates such as tributoxyethyl phosphate, tributyl phosphate, tricresyl phosphate, cresyl diphenyl phosphate, 2-ethylhexyl diphenyl phosphate, isodecyl diphenyl phosphate and triphenyl phosphate; trimellitate esters such as $C_1$–$C_9$ alkyl trimellitate; sulfonamides such as N-cyclohexyl-p-toluenesulfonamide, N-ethyl-o,p-toluenesulfonamide and o-toluenesulfonamide, and liquid oligomeric plasticizers. Preferred plasticizers are liquids with low volatility to avoid emissions of plasticizer at the common melt temperatures of polyamides. The trimellitates are examples of commonly preferred plasticizers having low volatility.

FILLERS:

The properties of the thermoplastic elastomer compositions of this invention can be modified, by addition of fillers such as clay, silica, talc, etc. which improve resistance to oil swelling. Such fillers are desirably incorporated into the rubber phase, especially when the polyamide is highly crystalline, to avoid imparting undue rigidity to the composition. Other ingredients can include those commonly employed in the compounding of thermoplastics and rubbers such as carbon black, titanium dioxide, pigments, zinc oxide, stearic acid, accelerators, stabilizers, antidegradants, processing aids, prevulcanization inhibitors, fire retardants, coupling agents and the like. Properties can be affected depending on when the filler is added, e.g. before or after vulcanization of the acrylate rubber. Carbon black, which can improve tensile strength, is desirably added prior to dynamic vulcanization, for instance in a masterbatch with the acrylate rubber. Stabilizers are often desirably added after dynamic vulcanization to provide lower oil swell. Desirable amounts and methods of addition of fillers, e.g. at up to about the parts by weight of rubber and polyamide, and other ingredients can be readily ascertained through routine experimentation by one skilled in the art of compounding aided by the illustrative teachings in the following examples.

PREPARATION OF THERMOPLASTIC ELASTOMER COMPOSITIONS:

Vulcanizable rubbers, although thermoplastic in the unvulcanized state, are often classified as thermosets because they can be cured to an unprocessable state. The improved thermoplastic elastomer compositions of this invention are processable as thermoplastics and are preferably prepared from blends of polyamide resin and vulcanizable acrylate rubber which are treated under time and temperature conditions to crosslink the rubber. Simultaneously masticating and curing such blends advantageously provides the thermoplastic compositions of this invention and avoids the production of thermosets. Thus, the thermoplastic elastomer compositions of this invention are preferably prepared by blending a mixture of vulcanizable acrylate rubber and a polyamide resin at a temperature above the melting point of the polyamide, adding crosslinking agent while continuously masticating the blend at a temperature sufficient to effect crosslink formation, using conventional masticating equipment, for example, a rubber mill, Brabender Mixer, Banbury Mixer, or a mixing extruder such as a twin screw continuous mixing extruder. The polyamide resin and vulcanizable rubber are mixed at a temperature sufficient to soften the resin or, more commonly, at temperature above the melting point of the polyamide resin. In many cases crosslinking agent is added after the molten polyamide resin and vulcanizable rubber are intimately mixed. In other cases, e.g. where a late or delayed acting curative is employed, crosslinking agent can be added prior to intimate melt mixing of the polyamide resin and rubber. Heating and masticating at vulcanization temperatures are generally adequate to complete the crosslink formation in a few minutes or less; if shorter times are desired, higher temperatures may be used. Mastication is preferably continued for a short time after the composition reaches maximum consistency, e.g. as indicated by maximum torque exerted by the mixer. Typically, mixing times of about 0.5–30 minutes are satisfactory.

A suitable range of temperatures for crosslink formation is from about the melting point of the polyamide resin to the decomposition temperature of the rubber which range is from about 100° to 350° with the maximum temperature varying somewhat depending upon the component polyamide and rubber, the presence of antidegradants and the mixing time. Typically, the range is from about 150° to 300°. A preferred range is from about 180° to 280°. To obtain thermoplastic compositions, it is important that mixing continues without interruption until substantial crosslinking occurs. If appreciable crosslinking is allowed after mixing has stopped, a thermoset unprocessable composition may be obtained. A few simple experiments within the skill of practitioners in the art utilizing available polyamide resins, vulcanizable acrylate rubbers and crosslinking agents will suffice to determine their applicability for the preparation of the improved products of this invention.

Methods other than dynamic vulcanization of blends of polyamide and acrylate rubber can be utilized to prepare the thermoplastic elastomer compositions of this invention. For example, the rubber can be fully vulcanized in the absence of the polyamide resin, either dynamically or statically, powdered, and mixed with the resin at a temperature above the melting or softening point of the polyamide resin. Provided that the crosslinked rubber particles are small, e.g. not greater than about 50 micrometers (microns), well dispersed and in an appropriate concentration, the compositions of this invention are attainable by blending crosslinked rubber with polyamide resin. A mixture which is outside the invention because it contains poorly dispersed or too large rubber particles can be comminuted by cold milling to reduce the weight average particle size to below about 50 microns, preferably to below about 20 microns, more preferably to below about 10 microns and even more preferably to below about 5 microns. After sufficient comminution or pulverization, a composition of this invention can be obtained. Frequently, a composition of poor dispersion or too large particle size is visibly obvious to the naked eye and observable in a molded sheet, especially in the absence of pigments and fillers; such compositions are outside the scope of this invention.

The characteristics of the thermoplastic elastomer compositions containing cured acrylate rubber depend upon the relative proportions of rubber and polyamide and whether the compositions are statically or dynamically cured. Static curing can give thermoset compositions when the blend contains more than 30 parts of cured acrylate rubber per 100 parts by weight of rubber and polyamide; whereas, dynamic curing of blends containing even up to 90 parts by of cured acrylate rubber per 100 parts of rubber and polyamide generally provides thermoplastic compositions. When such high rubber compositions are partially crosslinked the rubber and polyamide can comprise co-continuous phases. Generally, compositions comprising about 40 parts or more of cured acrylate rubber per 100 parts of rubber and polyamide are thermoplastic and elastomeric. Moreover, unplasticized compositions comprising less than about 35 parts of cured acrylate rubber per 100 parts rubber and polyamide can be considered to be toughened thermoplastics.

The effect of the relative proportions on blend composition characteristics cannot be defined with precision because the limits vary depending upon a number of factors, such as, the kind of polyamide and acrylate rubber, the presence of fillers, plasticizers and other ingredients, and the extent the rubber is cured. Of course, it is understood that the properties of the compositions of the invention may be modified by the addition of ingredients which are conventional in the compounding of polyamides, acrylate rubbers, and blends thereof. For additional information concerning compounding and dynamic vulcanization, refer to U.S. Pat. Nos. 4,104,210; 4,130,535 and 4,141,863, all of which are incorporated herein by reference.

The term "blend" as used herein means a mixture ranging from small particles of crosslinked rubber well dispersed in a polyamide matrix to co-continuous phases of polyamide and a partially-crosslinked rubber. Compositions prepared by dynamic vulcanization comprising a blend of polyamide, e.g. NYLON 6, and cured acrylate rubber, e.g. acrylic ester copolymer rubber, in the form of small particles dispersed throughout the polyamide are preferred. Especially preferred are such compositions comprising such rubber and polyamide in the range of 20 to 60 parts of polyamide per 100 parts of rubber and polyamide, more preferably less than about 55 parts of polyamide.

Thermoplastic elastomer compositions of this invention can be used to form a variety of molded, extruded, or calendered articles. The properties of such compositions depend upon the proportions of the components with a wide range of properties being available simply by varying such proportions.

The following disclosure is provided to illustrate specific embodiments and aspects of thermoplastic elastomer compositions of this invention but not does imply any limitation of the scope of the invention. The tensile strength of such compositions was determined in accordance with ASTM procedure D 638. Unless otherwise indicated specimens were pulled in a tensile tester at 50.8 cm. (20 inches) per minute to failure. Ultimate tensile stress (UTS) is the tensile strength at break and is reported in units of megaPascals (MPa). Tensile modulus at 100 percent elongation (M100) and tensile modulus at 300 percent elongation (M300) are reported in MPa in accordance with ASTM procedure D412. Ultimate elongation (UE) is the elongation at break and is reported as a percent of the original specimen length in accordance with ASTM procedure D412. Hardness (H) is reported as a Shore A hardness (A) or a Shore D hardness (D). Tension set (TS) is the extension remaining after a specimen has been stretched and held for 10 minutes at twice its original length, then allowed to retract; TS is measured as the percentage increase of the original length after 10 minutes of retraction in accordance with ASTM procedure D412. Oil swell (OS) is determined in accordance with ASTM procedure D 471; OS is the measured increase in specimen mass after immersion in hot oil, expressed as a percentage of original mass. Unless otherwise indicated, e.g. by a temperature in parentheses or otherwise, specimens were immersed for 70 hours in ASTM Reference Oil No. 3 at 150°. Low temperature brittle point (LTB) is determined in accordance with ASTM procedure D 746; LTB is the temperature at which the specimen fractured by brittle failure upon impact, reported in degrees Celsius.

Materials used in the following examples include:

Polyamides:
PA-1: Capron 8202NL NYLON 6 from Allied-Signal;
PA-1C: Capron 8202C NYLON 6 from Allied-Signal;
PA-2: Rilsan BMNO NYLON 11 from Rilsan Corp.;
PA-3: Grilamid L20G NYLON 12 from Emser Industries;
PA-4: Zytel 101 NYLON 6,6 from DuPont;
PA-5: Vydyne 60H NYLON 6,9 from Monsanto;
PA-6: NYLON 6/6,6 (mp: 213°)
PA-7: Elvamide 8064 NYLON 6/6,6/6,10 from DuPont;
PA-8: Zytel 109L NYLON polymer from DuPont; and
PA-9: Rilsan 6312 nylon block copolyester from Rilsan Corp.

Acrylate Rubbers:
R-1: VAMAC-G neat terpolymer of about 73 mole percent of ethylene, about 26 mole percent of methyl acrylate and about one mole percent of carboxylic acid from DuPont;
R-2: VAMAC-123 masterbatch of 100 parts of VAMAC-G 20 parts of fumed silica and 3 parts of stabilizers and processing aids.

Crosslinking agents:
XL-1: tris(hydroxymethyl)amino methane from Angus Chemical Company;
XL-2: LICA-44 neoalkoxy tri[N-ethylaminoethylamino] titanite from Kenrich Petrochemical;
XL-3: 4,4'-methylene dianiline from Olin Chemicals;
XL-4: 4,4'-methylenebis(cyclohexylamine) from Aldrich Chemical Company;
XL-5: N-(2-aminoethyl)-piperazine from Aldrich Chemical Company;
XL-6: Maglite D magnesium oxide from Merck;
XL-7: Mondur E-501 isocyanate-terminated polyester prepolymer from Mobay, about 19 percent NCO.

Stabilizers:
S-1: mixture of 0.4 pbw Irganox MD 1024 and 0.3 pbw Chimassorb 944LD and 0.2 pbw Irganox 1425 antioxidants from Ciba-Geigy;
S-2: mixture of 0.4 pbw Ethanox 330 from Ethyl Corp., 0.3 pbw calcium stearate, and 0.2 pbw Carbstab distearylthiodipropionate from Cincinnati Milacron.

Processing aids:
MgS: Magnesium stearate;
ZUN: Zelec UN unneutralized alcohol phosphate lubricant from DuPont; and
SAM: Bis (t-butylaminocyclohexyl)methane.

Fillers:
F-1: Novakup L207A silica from Malvern Minerals;
F-2: Burgess 2211 clay from Burgess Pigment Co.; and
F-3: Stan-White 500 calcium carbonate from Hardwick.

Plasticizers:
P-1: Santicizer 79-TM alkyl trimellitate plasticizer from Monsanto Chemical Company;
P-2: Santicizer 9 ortho, para-toluene sulfonamide plasticizer from Monsanto Chemical Company;
P-3 Santicizer 148 isodecyl diphenylphosphate plasticizer from Monsanto Chemical Company.

EXAMPLE 1

This example serves to illustrate thermoplastic elastomer compositions of this invention comprising polyamide PA-1, acrylic ester copolymer rubber R-1 and varying amounts of tris(hydroxymethyl) amino methane crosslinking agent XL-1. Controlling the degree of crosslinking, indicated by the amount of the composition, e.g. rubber, extractable in a solvent affords tailoring compositions to achieve a desired balance of properties.

Compositions according to this invention comprising tris(hydroxymethyl)amino methane crosslinking agent were prepared by melt mixing the polyamide PA-1 and rubber R-1 (containing 0.9 parts stabilizer S-1 per 100 parts rubber) at 100 rpm and 240° in a Brabender mixer; after 3 minutes crosslinking agent XL-1 was added to the blends which were dynamically vulcanized by continued mixing for an additional 3–4 minutes after maximum consistency was reached; the blend stocks were removed, cooled then returned to the Brabender for an additional 1–2 minutes of mixing; then the stocks were cooled and compression molded at 250°. Tensile properties of specimens are evaluated on a T-500 Tensometer at a speed of 20 inches (50.8 cm) per minute. The degree of crosslinking is determined from pressed films of each composition. Films, about 0.2 mm thick, were immersed in dichloromethane at about 23° for about 48 hours. The weight loss of the composition is divided by the weight of original rubber in the composition to determine extractable rubber (Extract). The analytical results indicate that compositions having not more than about 30 percent extractable rubber are sufficiently highly crosslinked to provide thermoplastic elastomer compositions of preferred properties.

evaluated on a T-500 Tensometer at a speed of 20 inches (50.8 cm) per minute.

The data shows that tensile properties are improved by vulcanization. The data also shows that properties are enhanced by use of a covalently crosslinking agent as compared to an ionomeric crosslinking agent. For instance, lower hardness, often with lower oil swell can be provided in compositions having a rubber:polyamide ratio of 9:1; lower hardness can be provided in compositions having a rubber: polyamide ratio of 8:2; lower oil swell and tension set can be provided in compositions having a rubber: polyamide ratio of 8:2 or less; and higher tensile properties can be provided in compositions having a rubber:polyamide ratio of 4:6 or less.

TABLE 1

| R-1 | 60 | 60 | 60 | 60 | 60 | 60 | 60 | 60 | 60 | 60 |
|---|---|---|---|---|---|---|---|---|---|---|
| PA-1 | 40 | 40 | 40 | 40 | 40 | 40 | 40 | 40 | 40 | 40 |
| XL-1 | 0 | 0.15 | 0.3 | 0.45 | 0.6 | 0.75 | 0.9 | 1.05 | 1.2 | 1.5 |
| S-1 | 0.54 | 0.54 | 0.54 | 0.54 | 0.54 | 0.54 | 0.54 | 0.54 | 0.54 | 0.54 |
| UTS | 0.3 | 6.4 | 14 | 20 | 27 | 29 | 28 | 29 | 29 | 31 |
| M100 | 0.8 | 3.8 | 11 | 16 | 16 | 18 | 17 | 19 | 18 | 18 |
| UE | 2320 | 250 | 170 | 180 | 260 | 260 | 250 | 260 | 240 | 270 |
| H | 42A | 60A | 80A | 89A | 42D | 44D | 46D | 48D | 47D | 48D |
| TS | 40 | 16 | 18 | 28 | 33 | 40 | 42 | 45 | 40 | 42 |
| OS(125) | * | 54 | 43 | 34 | 28 | 24 | 24 | 23 | 22 | 22 |
| OS(150) | * | 73 | 50 | 39 | 32 | 28 | 27 | 25 | 25 | 25 |
| OS(175) | * | * | 52 | 48 | 44 | 38 | 35 | 34 | 33 | 33 |
| Extract | 95 | 65 | 23 | 15 | 11 | 8.7 | 7.6 | 6.6 | 6.1 | 6.2 |

*Disintegrated

EXAMPLE 2

This example serves to illustrate thermoplastic elastomer compositions of this invention over a range of rubber levels, e.g. with a rubber to polyamide ratio from 9:1 to 4:6, having enhanced properties, e.g. UTS, UE, H, TS and/or OS, as compared to prior art compositions comprising no crosslinking agent or ionomeric crosslinking agent such as magnesium oxide.

Prior art compositions without crosslinking agent were prepared by melt mixing polyamide PA-1 and acrylic ester copolymer rubber R-1 containing 0.81 parts stabilizer S-2 per 100 parts rubber at 100 rpm and 240° for 10 minutes in a Brabender mixer; the blend stocks were removed, cooled then returned to the mixer and remixed for one additional minute; then the blend stocks were removed and compression molded at 250°. Prior art compositions comprising ionomeric crosslinking agents were prepared by melt mixing the polyamide and rubber at 100 rpm and 240° in a Brabender mixer; after 2 minutes magnesium oxide, crosslinking agent, XL-6 and magnesium stearate were added to the blends which were dynamically vulcanized by continued mixing for an additional 10 minutes or until 3 minutes after maximum consistency is reached; then the stocks were cooled, remixed for 1–2 minutes and then compression molded at 280°. Compositions according to this invention comprising tris(hydroxymethyl)amino methane, crosslinking agent XL-1, were prepared by melt mixing the polyamide and rubber at 100 rpm and 240° in a Brabender mixer; after 3 minutes the crosslinking agent XL-1 was added to the blends which were dynamically vulcanized by continued mixing for an additional 3–4 minutes after maximum consistency was reached; the blend stocks were removed, cooled then returned to the Brabender for an additional 1–2 minutes of mixing; then the stocks were cooled and compression molded at 250°. Tensile properties of specimens are

TABLE 2A

| R-1 | 90 | 90 | 90 | 90 | 90 |
|---|---|---|---|---|---|
| PA-1 | 10 | 10 | 10 | 10 | 10 |
| XL-1 | 0 | 0 | 0.36 | 0.54 | 0.72 |
| XL-6 | 0 | 0.9 | 0 | 0 | 0 |
| MgS | 0 | 0.45 | 0 | 0 | 0 |
| S-2 | 0.81 | 0.81 | 0.81 | 0.81 | 0.81 |
| UTS | 0.3 | 11 | 6.7 | 7.2 | 7.9 |
| M100 | 0.3 | 1.6 | 0.8 | 1.3 | 1.8 |
| UE | 370 | 640 | 580 | 230 | 200 |
| H | 18A | 44A | 32A | 36A | 36A |
| TS | 40 | 3 | 6 | 4 | 2 |
| OS(125) | * | 94 | 90 | 78 | 61 |
| OS(150) | * | 137 | 125 | 97 | 90 |
| OS(175) | * | 153 | 179 | 117 | 100 |
| Extract | 101 | 16 | 33 | 15 | 14 |

TABLE 2B

| R-1 | 80 | 80 | 80 | 80 | 80 |
|---|---|---|---|---|---|
| PA-2 | 20 | 20 | 20 | 20 | 20 |
| XL-1 | 0 | 0 | 0.48 | 0.64 | 0.8 |
| XL-6 | 0 | 0.8 | 0 | 0 | 0 |
| MgS | 0 | 0.4 | 0 | 0 | 0 |
| S-2 | 0.72 | 0.72 | 0.72 | 0.72 | 0.72 |
| UTS | 0.3 | 14 | 7.3 | 8.2 | 8.2 |
| M100 | 0.3 | 5.7 | 2.2 | 3.7 | 4.1 |
| UE | 430 | 450 | 260 | 190 | 180 |
| H | 22A | 62A | 44A | 48A | 51A |
| TS | 40 | 6 | 2 | 2 | 2 |
| OS(125) | * | 78 | 72 | 66 | 57 |
| OS(150) | * | 99 | 91 | 81 | 72 |
| OS(175) | * | 118 | 109 | 96 | 86 |
| Extract | 100 | 13 | 19 | 13 | 12 |

TABLE 2C

| R-1 | 70 | 70 | 70 | 70 | 70 |
|---|---|---|---|---|---|
| PA-2 | 30 | 30 | 30 | 30 | 30 |
| XL-1 | 0 | 0 | 0.56 | 0.7 | 0.84 |
| XL-6 | 0 | 1.4 | 0 | 0 | 0 |
| MgS | 0 | 0.35 | 0 | 0 | 0 |
| S-2 | 0.63 | 0.63 | 0.63 | 0.63 | 0.63 |
| UTS | 0.3 | 22 | 11 | 13 | 14 |
| M100 | 0.4 | 14 | 5.2 | 6.4 | 8.1 |
| UE | 420 | 290 | 200 | 200 | 170 |
| H | 28A | 82A | 63A | 70A | 90A |
| TS | 43 | 16 | 5 | 7 | 8 |
| OS(125) | * | 47 | 46 | 45 | 43 |
| OS(150) | * | 60 | 59 | 53 | 51 |
| OS(175) | * | 68 | 64 | 63 | 62 |
| Extract | 100 | 6.5 | 16 | 11 | 11 |

TABLE 2D

| R-1 | 60 | 60 | 60 | 60 |
|---|---|---|---|---|
| PA-2 | 40 | 40 | 40 | 40 |
| XL-1 | 0 | 0 | 0.72 | 1.08 |
| XL-6 | 0 | 1.2 | 0 | 0 |
| MgS | 0 | 0.3 | 0 | 0 |
| S-2 | 0.54 | 0.54 | 0.54 | 0.54 |
| UTS | 0.2 | 27 | 24 | 27 |
| M100 | 0.6 | 19 | 14 | 16 |
| UE | 2500 | 320 | 240 | 240 |
| H | 38A | 45D | 40D | 44D |
| TS | 47 | 40 | 31 | 36 |
| OS(125) | * | 39 | 25 | 23 |
| OS(150) | * | 46 | 29 | 26 |
| OS(175) | * | 54 | 37 | 31 |
| Extract | 97 | 6.4 | 10 | 8 |

TABLE 2E

| R-1 | 50 | 50 | 50 | 50 |
|---|---|---|---|---|
| PA-2 | 50 | 50 | 50 | 50 |
| XL-1 | 0 | 0 | 0.75 | 0.9 |
| XL-6 | 0 | 1 | 0 | 0 |
| MgS | 0 | 0.25 | 0 | 0 |
| S-2 | 0.45 | 0.45 | 0.45 | 0.45 |
| UTS | 2.7 | 32 | 29 | 28 |
| M100 | 2.4 | 24 | 18 | 17 |
| UE | 140 | 320 | 260 | 250 |
| H | 72A | 61D | 52D | 49D |
| TS | — | 65 | 49 | 47 |
| OS(125) | * | 18 | 17 | 17 |
| OS(150) | * | 29 | 18 | 20 |
| OS(175) | * | 36 | 23 | 24 |
| Extract | 95 | 6.3 | 10 | 9 |

TABLE 2F

| R-1 | 40 | 40 | 40 | 40 |
|---|---|---|---|---|
| PA-2 | 60 | 60 | 60 | 60 |
| XL-1 | 0 | 0 | 0.6 | 0.72 |
| XL-6 | 0 | 0.8 | 0 | 0 |
| MgS | 0 | 0.2 | 0 | 0 |
| S-2 | 0.36 | 0.36 | 0.36 | 0.36 |
| UTS | 4.8 | 32 | 39 | 38 |
| M100 | 4.8 | 32 | 28 | 28 |
| UE | 100 | 140 | 300 | 260 |
| H | 85A | 67D | 62D | 64D |
| TS | — | 75 | 70 | 67 |
| OS(125) | * | 9 | 4 | 4 |
| OS(150) | * | 13 | 5 | 5 |
| OS(175) | * | 19 | 7 | 8 |

*disintegrated

EXAMPLE 3

This example serves to illustrate thermoplastic elastomer compositions based on a variety of polyamides, including NYLON 6, NYLON 11, NYLON 12, NYLON 6,6, NYLON 6,9, the mixed polyamides PA-6, PA-7 and PA-8, and block polyether-polyamide PA-9. The polyamides were combined with acrylic ester copolymer rubber R-1 and tris(hydroxymethyl)amino methane, crosslinking agent, X-1, in the proportions specified in Table 3 essentially in the manner of Examples 1 and 2. The analytical results reported in Table 3 indicate that thermoplastic elastomer compositions according to this invention can be prepared from a variety of polyamides.

TABLE 3

| R-1 | 60 | 60 | 60 | 60 | 60 | 60 | 60 | 60 | 60 |
|---|---|---|---|---|---|---|---|---|---|
| PA-1 | 40 | 0 | 0 | 0 | 0 | 0 | 0 | 0 | 0 |
| PA-2 | 0 | 40 | 0 | 0 | 0 | 0 | 0 | 0 | 0 |
| PA-3 | 0 | 0 | 40 | 0 | 0 | 0 | 0 | 0 | 0 |
| PA-4 | 0 | 0 | 0 | 40 | 0 | 0 | 0 | 0 | 0 |
| PA-5 | 0 | 0 | 0 | 0 | 40 | 0 | 0 | 0 | 0 |
| PA-6 | 0 | 0 | 0 | 0 | 0 | 40 | 0 | 0 | 0 |
| PA-7 | 0 | 0 | 0 | 0 | 0 | 0 | 40 | 0 | 0 |
| PA-8 | 0 | 0 | 0 | 0 | 0 | 0 | 0 | 40 | 0 |
| PA-9 | 0 | 0 | 0 | 0 | 0 | 0 | 0 | 0 | 40 |
| XL-1 | 1.05 | 1.05 | 1.05 | 1.05 | 1.05 | 1.05 | 1.05 | 1.05 | 1.05 |
| S-1 | 0.54 | 0.54 | 0.54 | 0.54 | 0.54 | 0.54 | 0.54 | 0.54 | 0.54 |
| UTS | 29 | 22 | 22 | 24 | 23 | 23 | 25 | 24 | 24 |
| M100 | 19 | 12 | 13 | 17 | 13 | 12 | 9 | 17 | 9 |
| UE | 260 | 350 | 270 | 180 | 280 | 250 | 320 | 210 | 330 |
| H | 48D | 42D | 48D | 45D | 43D | 39D | 91A | 44D | 88A |
| TS | 45 | 50 | 48 | 28 | 42 | 28 | 16 | 25 | 16 |
| OS (125) | 23 | 21 | 25 | 22 | 21 | 25 | 23 | 22 | 30 |
| OS (150) | 25 | 30 | 33 | 25 | 26 | 29 | 40 | 29 | 34 |
| OS (175) | 34 | 61 | 64 | 26 | 46 | 47 | 82 | 33 | 50 |

EXAMPLE 4

This example serves-to further illustrate thermoplastic elastomer compositions which have been dynamically vulcanized with one of a variety of covalently crosslinking agents. Such compositions exhibit enhanced resistance to oil swell as compared to compositions dynamically vulcanized with ionically crosslinking agents. The compositions were prepared essentially in the manner of Examples 1 and 2. The analytical results reported in Table 4 indicate that a variety of covalently crosslinking agents can be used to provide thermoplastic elastomer compositions with higher tensile properties and higher resistance to oil swell. The prior art composition crosslinked with crosslinking agent XL-6 (magnesium oxide) shows higher oil swell values.

TABLE 4

| R-1 | 60 | 60 | 60 | 60 | 60 | 60 |
|---|---|---|---|---|---|---|
| PA-1C | 40 | 40 | 40 | 40 | 40 | 40 |
| XL-1 | 0 | 1.05 | 0 | 0 | 0 | 0 |
| XL-3 | 0 | 0 | 1.05 | 0 | 0 | 0 |
| XL-4 | 0 | 0 | 0 | 0.75 | 0 | 0 |
| XL-5 | 0 | 0 | 0 | 0 | 0.75 | 0 |
| XL-6 | 0 | 0 | 0 | 0 | 0 | 1.2 |
| MgS | 0 | 0 | 0 | 0 | 0 | 0.3 |
| SAM | 0 | 0 | 0.15 | 0 | 0 | 0 |
| ZUN | 0 | 0 | 0.3 | 0.3 | 0 | 0 |
| S-1 | 0 | 0 | 0.54 | 0 | 0 | 0 |
| S-2 | 0.54 | 0.54 | 0 | 0.54 | 0.54 | 0.54 |
| UTS | 0.3 | 26 | 26 | 21 | 24 | 20 |
| M100 | 0.4 | 18 | 18 | 17 | 16 | 15 |
| UE | 1870 | 220 | 200 | 170 | 260 | 230 |

TABLE 4-continued

| H | 36A | 45D | 42D | 35D | 37D | 87A |
|---|---|---|---|---|---|---|
| TS | 55 | 39 | 35 | 33 | 36 | 27 |
| OS(125) | * | 24 | 22 | 37 | 30 | 44 |
| OS(150) | * | 28 | 26 | 39 | 35 | 51 |
| OS(175) | * | 35 | 32 | 44 | 44 | 64 |
| Extract | 96 | 8 | 7 | 15 | 11 | 10 |

*Disintegrated

EXAMPLE 5

This example serves to illustrate thermoplastic elastomer composition dynamically vulcanized with covalently crosslinking agents comprising isocyanate-terminated polyester prepolymer. Such compositions are especially soft and can exhibit low tension set and enhanced resistance to oil swell at high temperatures. The compositions were prepared essentially in the manner of Examples 1 and 2 in the proportion of components set forth in Table 5. The results of analyses indicate that unneutralized alcohol phosphate can be used to promote enhanced crosslinking and lower oil swell.

TABLE 5

| R-1 | 60 | 60 | 60 | 60 | 60 | 60 | 60 | 60 |
|---|---|---|---|---|---|---|---|---|
| PA-1C | 40 | 40 | 40 | 40 | 40 | 40 | 40 | 40 |
| XL-7 | 0 | 1.2 | 1.2 | 1.2 | 3 | 3 | 3 | 3 |
| ZUN | 0 | 0 | 0 | 0.3 | 0 | 0 | 0.3 | 0.15 |
| MgS | 0 | 0 | 0.3 | 0 | 0 | 0.3 | 0 | 0.15 |
| S-2 | 0.54 | 0.54 | 0.54 | 0.54 | 0.54 | 0.54 | 0.54 | 0.54 |
| UTS | 0.3 | 5.8 | 7.0 | 16 | 21 | 10 | 26 | 20 |
| M100 | 0.4 | 2.4 | 4.6 | 6.4 | 13 | 10 | 18 | 17 |
| UE | 1870 | 450 | 220 | 240 | 190 | 100 | 200 | 140 |
| H | 36A | 55A | 64A | 65A | 77A | 78A | 90A | 77A |
| TS | 55 | 10 | 16 | 3 | 12 | Failed | 21 | 13 |
| OS(125) | * | 64 | 57 | 61 | 48 | 43 | 35 | 46 |
| OS(150) | * | 78 | 64 | 72 | 52 | 47 | 38 | 49 |
| OS(175) | * | 84 | 67 | 82 | 62 | 49 | 44 | 56 |
| Extract | 96 | 55 | 49 | 30 | 16 | 23 | 11 | 17 |

*Disintegrated

EXAMPLE 6

This example serves to illustrate thermoplastic elastomer compositions comprising a variety of fillers. The compositions were prepared from components in the proportions set forth in Table 6 essentially in the manner of Example 1 except that fillers and stabilizers were preblended with the rubber to form a masterbatch. In the case of R-2, the rubber is provided as a masterbatch.

The results of analyses indicate that fillers can be used to provide compositions of this invention with desired properties such as low oil swell.

TABLE 6

| R-1 | 60 | 60 | 60 | — |
| R-2 | — | — | — | 73.8 |
| PA-1 | 40 | 40 | 40 | 40 |
| XL-1 | 1.2 | 1.2 | 1.2 | — |
| XL-3 | — | — | — | 1.2 |
| S-2 | 0.54 | 0.54 | 0.54 | — |
| F-1 | 12 | — | — | — |
| F-2 | — | — | 12 | — |
| F-3 | — | 12 | — | — |
| UTS | 24 | 25 | 25 | 29 |
| M100 | 18 | 18 | 20 | 21 |
| UE | 180 | 190 | 190 | 180 |
| H | 46D | 45D | 48D | 42D |
| TS | 37 | 32 | 37 | 31 |
| OS(125) | 21 | 24 | 21 | 20 |
| OS(150) | 24 | 28 | 25 | 22 |
| OS(175) | 32 | 35 | 31 | 27 |

EXAMPLE 7

This example serves to illustrate thermoplastic elastomer compositions comprising a variety of plasticizers. The compositions were prepared from components in the proportions set forth in Table 7 essentially in the manner of Example 1 except that plasticizer was added to the blend with the polyamide. The results of analyses indicate that plasticizers can be effective in providing compositions with exceptionally low oil swell even at elevated temperatures.

TABLE 7

| R-2 | 73.8 | 73.8 | 73.8 | 73.8 | 73.8 | 73.8 |
|---|---|---|---|---|---|---|
| PA-1 | 40 | 40 | 40 | 40 | 40 | 40 |
| XL-1 | 1.2 | 1.2 | 1.2 | 1.2 | 1.2 | 1.2 |
| P-1 | 0 | 10 | 20 | 0 | 0 | 0 |
| P-2 | 0 | 10 | 20 | 20 | 40 | 0 |
| P-3 | 0 | 0 | 0 | 0 | 0 | 20 |
| UTS | 26 | 20 | 16 | 22 | 22 | 20 |
| M100 | 22 | 15 | 12 | 16 | 10 | 14 |
| UE | 220 | 170 | 180 | 220 | 260 | 170 |
| H | 43D | 37D | 90A | 39D | 90A | 72A |
| TS | 40 | 25 | 20 | 25 | 20 | 21 |
| OS(125) | 21 | 15 | 6 | 15 | 6 | 16 |
| OS(150) | 24 | 18 | 7 | 17 | 6 | 19 |
| OS(175) | 29 | 23 | 13 | 22 | 11 | 26 |

COMPARATIVE EXAMPLE

This example serves to further illustrate thermoplastic elastomer compositions dynamically vulcanized with ionically crosslinking agent XL-6, magnesium oxide, exhibit higher oil swell and may tend to disintegrate in oil at higher temperatures. The compositions were prepared essentially in the manner of Example 1 in the proportion of components set forth in Table 8.

TABLE 8

| R-1 | 60 | 60 | 60 | 60 | 60 | 60 | 60 |
|---|---|---|---|---|---|---|---|
| PA-1 | 40 | 40 | 40 | 40 | 40 | 40 | 40 |
| XL-6 | 0 | 0.3 | 0.6 | 0.9 | 1.2 | 1.5 | 1.8 |
| MgS | 0.3 | 0.3 | 0.3 | 0.3 | 0.3 | 0.3 | 0.3 |
| S-1 | 0.54 | 0.54 | 0.54 | 0.54 | 0.54 | 0.54 | 0.54 |
| UTS | 0.34 | 6.8 | 11 | 18 | 20 | 24 | 26 |
| M100 | 0.83 | 2.5 | 6.9 | 14 | 15 | 17 | 19 |
| UE | 2320 | 400 | 290 | 280 | 290 | 300 | 300 |
| H | 42A | 57A | 70A | 40D | 42D | 40D | 40D |
| TS | 40 | 10 | 12 | 44 | 40 | 27 | 32 |
| OS(125) | * | 61 | 55 | 47 | 42 | 38 | 38 |
| OS(150) | * | 79 | 69 | 55 | 49 | 44 | 43 |
| OS(175) | * | * | * | 58 | 55 | 50 | 51 |
| Extract | 95 | 45 | 29 | 8 | 8 | 8 | 7 |

*Disintegrated

What is claimed is:

1. A thermoplastic elastomeric composition having a tension set less than 60 percent, comprising a dynamically vulcanized blend of a) a non-crystalline, covalently-crosslinked acrylate rubber having a $T_g$ below about 23° C., and b) from about 20 parts to less than 55 parts of a thermoplastic polyamide resin selected from nylons having a softening point above 100° C., per 100 parts of rubber and polyamide, wherein no more than 50 percent of said rubber is extractable from the blend and said polyamide is not crosslinked.

2. A composition according to claim 1 wherein said polyamide comprises nylon 6, nylon 6,6, nylon 11, nylon 12, nylon 6.66 or a mixture or copolymer thereof.

3. A composition according to claim 1 wherein said rubber is a polyacrylate rubber with acid, hydroxy or epoxy groups as crosslinking sites.

4. A composition according to claim 1 wherein said acrylate rubber is an olefin/acrylic ester copolymer rubber.

5. A composition according to claim 4 wherein said rubber contains carbolxylic acid monomer units.

6. A composition according to claim 5 wherein said copolymer rubber is covalently crosslinked by a polyamine.

7. A composition according to claim 6 wherein said rubber comprises a copolymer of ethylene, alkyl acrylate and unsaturated carboxylic acid.

8. A composition according to claim 6 further comprising particulate filler which is present in an amount up to the equivalent of the total parts by weight of the rubber and polyamide present in the composition.

9. A composition according to claim 6 further comprising plasticizer which is present in an amount between about 10 and 50 parts by weight of the composition.

10. A composition according to claim 6 wherein no more than about 30 percent of said rubber is extractable.

11. A composition according to claim 10 wherein no more than about 20 percent of said rubber is extractable.

12. A thermoplastic elastomeric composition having a tension set less than 60 percent, comprising a dynamically vulcanized blend of a) a non-crystalline, covalently-crosslinked, acid-containing, acrylic ester/olefin rubber having a $T_g$ below about 23° C., and b) from about 20 parts to less than 55 parts of a thermoplastic polyamide resin selected from nylons having a softening point above 100° C., per 100 parts of rubber and polyamide, wherein no more than 50 percent of said rubber is extractable from the blend and said polyamide is not crosslinked.

13. A composition according to claim 12 wherein said rubber is covalently-crosslinked by a polyamine.

14. A composition according to claim 13 wherein said polyamide comprises nylon 6, nylon 6,6, nylon 11, nylon 12, nylon 6,66 or a mixture or copolymer thereof.

15. A composition according to claim 14 wherein said rubber contains carboxylic acid monomer units.

16. A composition according to claim 15 wherein said rubber comprises a copolymer of ethylene, alkyl acrylate and unsaturated carboxylic acid.

17. A composition according to claim 16 wherein no more than about 30 percent of said rubber is extractable.

18. A thermoplastic elastomeric composition having a tension set less than 60 percent, comprising a dynamically vulcanized blend of a) a copolymer of olefin/acrylic ester/carboxylic acid having a $T_g$ below about 23° C., covalently crosslinked by a polyamine, and b) from about 20 parts to less than 55 parts of a thermoplastic nylon resin having a softening point above 100° C., per 100 parts of copolymer and nylon, wherein no more than 50 percent of said rubber is extractable from the blend and said nylon is not crosslinked.

19. A thermoplastic elastomeric composition having a tension set less than 60 percent, consisting essentially of a dynamically vulcanized blend of a) a non-crystalline, covalently-crosslinked acrylate rubber having a $T_g$ below about 23° C., and b) from about 20 parts to less than 55 parts of a thermoplastic polyamide resin selected from nylons having a softening point above 100° C., per 100 parts of rubber and polyamide, wherein no more than 50 percent of said rubber is extractable from the blend and said polyamide is not crosslinked.

* * * * *